G. H. RIDLON.
NUT TAPPING MACHINE.
APPLICATION FILED OCT. 14, 1912.
1,217,998.
Patented Mar. 6, 1917.
2 SHEETS—SHEET 1.
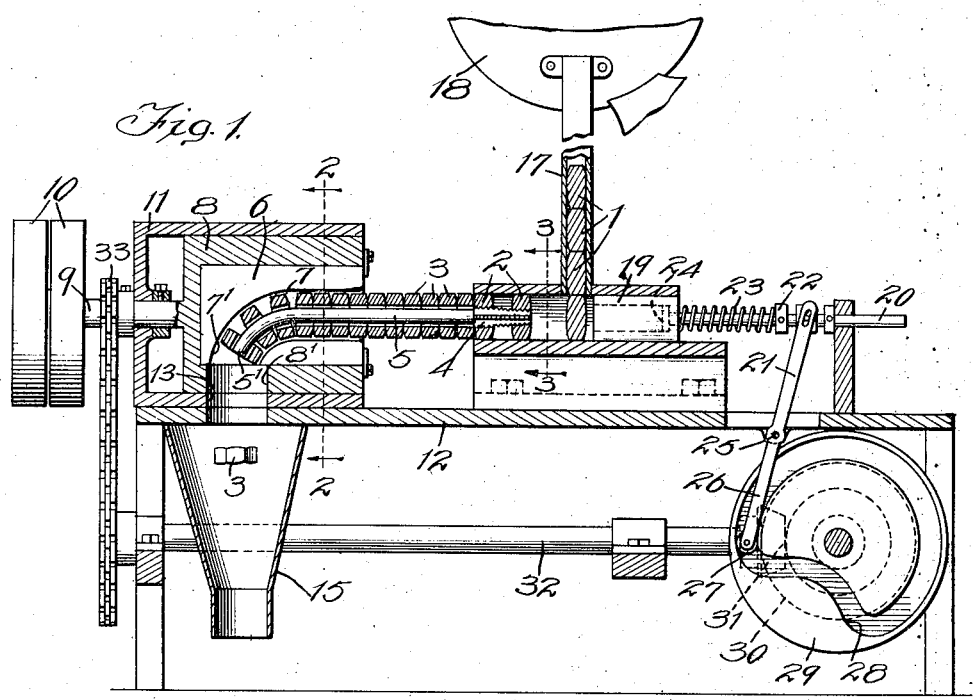
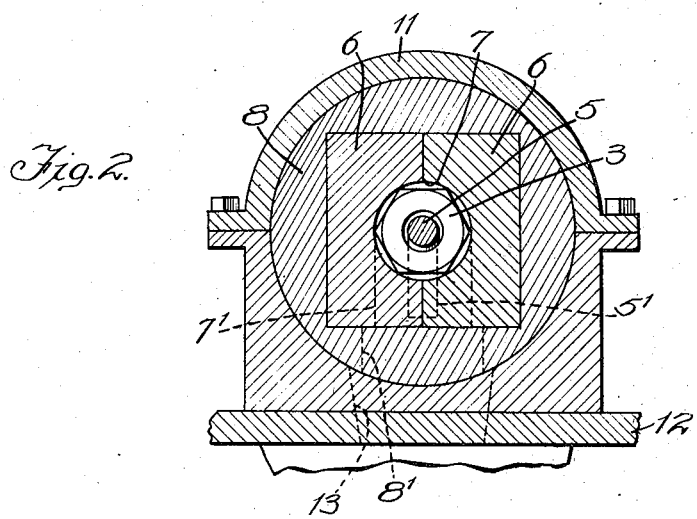
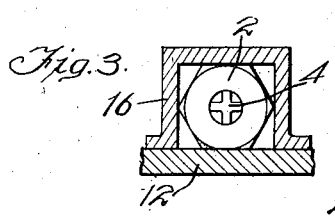
Witnesses:
W. F. Kilroy
R. Bauerle
Inventor
George H. Ridlon
By Shie W. Kie
Attys G. H. RIDLON.
NUT TAPPING MACHINE.
APPLICATION FILED OCT. 14, 1912.
1,217,998.
Patented Mar. 6, 1917.
2 SHEETS—SHEET 2.
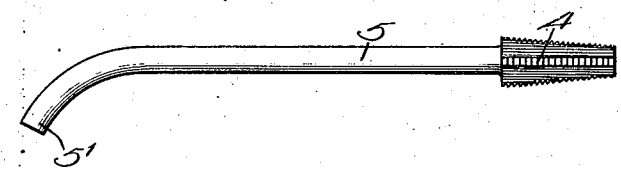
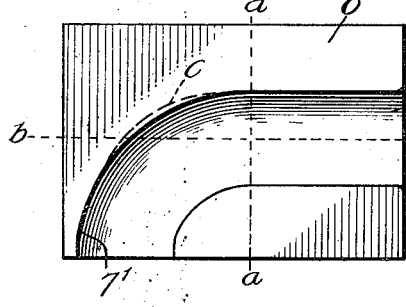
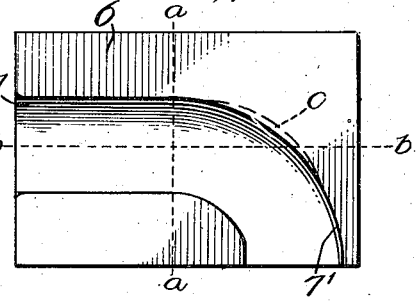
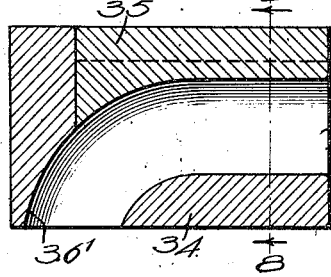
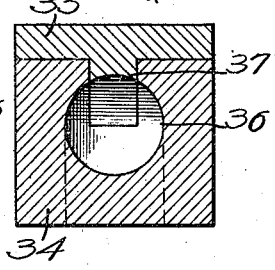
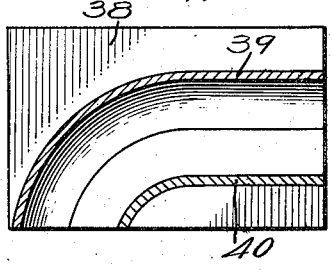
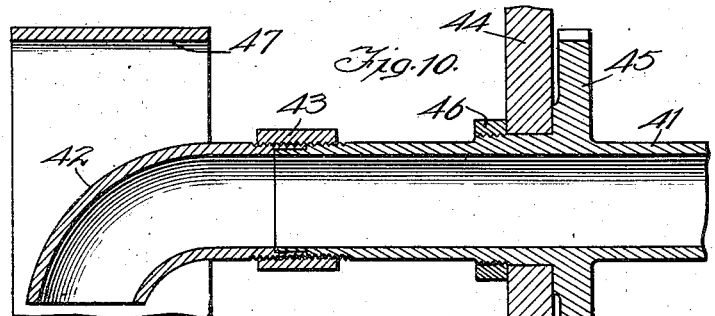
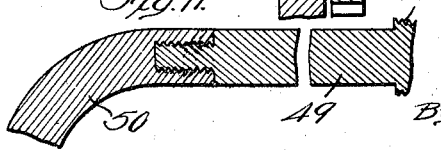

UNITED STATES PATENT OFFICE.

GEORGE H. RIDLON, OF SOUTH WHITLEY, INDIANA, ASSIGNOR TO GRIP NUT COMPANY, OF CHICAGO, ILLINOIS, A CORPORATION OF ILLINOIS.

NUT-TAPPING MACHINE.

1,217,998.      Specification of Letters Patent.      Patented Mar. 6, 1917.

Application filed October 14, 1912. Serial No. 725,598.

*To all whom it may concern:*

Be it known that I, GEORGE H. RIDLON, a citizen of the United States, residing at South Whitley, in the county of Whitley and State of Indiana, have invented certain new and useful Improvements in Nut-Tapping Machines, of which the following is a description.

My invention belongs to that general class of devices known as nut tapping machines, or the like, and relates particularly to an improved machine and tap and holder therefor. The machine is particularly designed to operate continuously without stopping any part for the removal of the nuts, which are automatically fed into the machine, tapped, and discharged into a suitable receptacle or hopper. The invention has among its objects the production of a device of the kind described that is simple, convenient, rapid, efficient, and satisfactory, and that may be manufactured at comparatively little cost. It has among its further objects the production of a device that is continuous in operation, that is compact, and that does not require the constant attention of an operator. With a preferred form of the machine an operator is required only in stopping or starting the machine, or in seeing that a supply of nuts to be tapped are in the feeding hopper, and even all of this may be arranged to be done automatically.

To this end my invention consists in the novel construction, arrangement and combination of parts herein shown and described, and more particularly pointed out in the claims.

In the drawings, wherein like reference characters indicate like or corresponding parts, Figure 1 is substantially a sectional view of a nut tapping machine, embodying my invention.

Fig. 2 is a sectional view taken substantially on line 2, 2 of Fig. 1.

Fig. 3 is a sectional view taken substantially on line 3, 3 of Fig. 1.

Fig. 4 is a side elevation of the tap.

Fig. 5 is a view in elevation of the inner side of one half of the tap chuck or holder.

Fig. 6 is a similar view of the other half.

Fig. 7 is a sectional view of another form of tap chuck.

Fig. 8 is a sectional view of the same taken substantially on line 8, 8 of Fig. 7.

Fig. 9 is a view in elevation of half of a chuck similar to that shown in Fig. 5, provided with a removable lining.

Fig. 10 is a sectional view of a different form of tap chuck or holder, and

Fig. 11 is a sectional view of a portion of a modified form of tap.

Referring to the drawings, 1, 1, etc., are nuts to be tapped, 2, 2 are nuts positioned on the cutter of the tap for the cutting of the thread or tap nut, and 3, 3, etc., are nuts that have been tapped, and are therefore ready to be removed from the machine. The invention in its broadest sense comprises a slitable tap and the chuck for holding the same and rotating it, and also includes means for feeding the nuts to the tap. As illustrated in Fig. 1, the nuts are fed to the tap, and after passing by the cutting tool of the tap, move along the shank of the tap and drop off the opposite end into a suitable receptacle. I have illustrated in the drawings a simple mechanism for driving the tap chuck, and for automatically feeding the nuts to the tap, it being understood, however, that many modifications of this part of the machine are possible.

The tap consists of a suitable thread cutting tool or tap 4, provided with a shank 5, which is preferably bent or offset at the opposite end at 5′ for the purpose hereafter mentioned. The tap is arranged within the machine and centered by what may be termed a tap chuck or holder, which, co-operating with the tapped nuts, holds the tap. The chuck or holder 6 illustrated in Figs. 1, 2, 5 and 6, preferably consists of a plurality of parts, as shown, two parts 6, 6, which are provided with an opening or aperture through the same, the rear end of the aperture being curved or bent from the straight line as at 7', the angle or curvature or angle of the bend being as desired, or as found necessary. The angle of the aperture at the point where it comes to the exterior of the chuck relative the axis of rotation, or the axis of the straight portion of the aperture, may be as found most satisfactory for the work to be done. The tap shank end 5' is bent to conform to the angle or curvature of the aperture, the proportions of the tap shank depending upon the chuck, the machine to be operated, the size of the nuts, etc. As before mentioned, the tap is supported and centered within this chuck by the tapped nuts, as very clearly shown in Fig. 1. As the chuck is rotated, the nuts move along the shank from the cutter, supporting the tap, those at the end bearing against the curved part of the aperture, and preventing lengthwise movement of the tap. By angling the tap and the aperture through the chuck, as shown, the tap is rotated by the rotation of the chuck. It will thus be seen that the tap is operated continuously in tapping the nuts without any direct connection between the chuck and tap, except through nuts passing over the shank, so that it is possible to tap the nuts and move them along the shank and off the end, permitting the machine to operate continuously without requiring the removal of the tap at intervals to remove the nuts. The purpose of making the chuck in a plurality of parts, as shown, is to simplify the manufacture of the chuck and to permit the ready insertion of the tool. The chuck parts 6, 6 may be rotated and supported in any suitable manner, as shown they are arranged in a rotatable chuck support 8, arranged in a head 11, carried by a suitable frame 12. The chuck part holder 8 is rotated by a shaft 9 and driving pulley 10, or the equivalent. Referring particularly to Figs. 1 and 2, the chuck holder 8 is provided with an opening 8' through one side, and the carrier 11 and frame 12 with a hole 13, so that as the part 8 and the chuck 6, 6 are rotated, the nuts may drop from the end 5' of the shank through the opening into a suitable receptacle. In Fig. 1, I have shown a spout or hopper 15, into which the nuts 3 may be dropped from the chuck, it being understood that any suitable receptacle may be arranged to catch the nuts. In starting the device in operation, it being understood, as previously mentioned, that the tap normally loosely fits the aperture of the chuck, and is supported and centered by the nuts, it is necessary to place several nuts on the tap before starting the mechanism in order to properly support and center the tap. As soon as the machine starts operating, these nuts are replaced by the newly tapped nuts, and so on, the nuts sliding along the shank and depositing in a suitable receptacle.

To feed the nuts upon the cutting tool 4, I provide a chambered part 16, or conveyer, arranged so that the nuts may be conveyed along the same to the cutter, and after they are engaged by the cutting tool, are prevented from rotation until the nut is tapped, and passes upon the shank 5, at which time it is immaterial whether the nuts rotate upon or with the shank. As illustrated in Fig. 1, a hopper 18, of any suitable form and construction, is arranged above the machine, into which a supply of nuts may be placed. The hopper or receptacle 18 is connected by conveyer 17 with the conveyer part 16, so that the nuts are fed down one at a time, and upon the edge, substantially as shown in Fig. 1. It may be mentioned that any suitable means may be provided for agitating the nuts in the receptacle 18, or causing them to enter the conveyer 17 and feed down to be placed upon the tap.

To move the nuts from the foot of the conveyer 17 to the tap, I provide a plunger 19, or its equivalent. The plunger 19 is adapted to reciprocate back and forth at intervals, and push a nut from the foot of the chute 17 on to the tap, where it will be engaged by the thread cutting tool. Referring to Fig. 1, the plunger is provided with an actuating rod 20, to which is connected an arm 21. The rod 20 may be connected directly to the plunger 19, if desired. As shown, however, a spring 23 is arranged between a collar 22, arranged upon the rod and the plunger, so that as the arm 21 is moved toward the plunger, the collar 22 bearing on spring 23, forces the plunger toward the tap, the spring being sufficiently strong or stiff to serve in substantially the same manner as a direct connection. However, in the case of any binding or jamming of the nut at the foot of the conveyer, the spring will be compressed, thereby preventing injury to the machine. A collar 24 or flange is arranged on the rod 20, so as to draw the plunger back on the return movement of the arm 21.

The relative rate of travel of the plunger and the tap may be as desired or preferred. The arm 21 may be rocked in any suitable manner, as shown, it is extended as at 26, the same being pivotally secured at 25 to the frame. The free end of the arm 26 is provided with a roller 27, which coöperates with a cam wheel 29, having a cam slot 28 therein. The cam wheel 29 is driven by a bevel gear 30 from a pinion 31, carried by a shaft 32, which may be driven by gears 33, or sprocket chains, or belts, from the shaft 9.

It was previously stated that the chuck parts 6, 6 were made in a plurality of parts for convenience in manufacture and for convenience in the insertion of the tool. Referring to Figs. 5 and 6, it may be mentioned that the division of the chuck parts, instead of being made as shown, may be substantially on the lines $a$, $a$, or transversely the chuck, or along the lines $b$, $b$, or along any other lines of division that will serve the purpose. While it is shown made in two parts, it may be made in any number of parts. I might also mention the fact that while the aperture is shown uniform in cross section throughout its length, I do not wish to be understood as limiting myself to this construction, as there might be occasions when it would be desirable to vary the aperture, as for example, by cutting the chuck away, as for example, as indicated by the dotted lines $c$ in Figs. 5 and 6, or in some other desired way.

In Figs. 7 and 8, I show a modified form of chuck, in which 34 is one part provided with a removable part 35, the cover being so arranged that enough of the opening 36 is exposed to permit the ready insertion of the tap shown, or finishing of the device. This chuck is also curved at 36' similar to the other chucks. The thickness of the cover part 35 may be as desired. As shown, the entire cover does not extend to the aperture, but the same is provided with an extending part 35, which fits into the opening.

In Fig. 9, I illustrate a chuck very similar to that shown in Figs. 5 and 6, except, however, that the same is provided with a movable lining made in two parts, 39 and 40, which may be divided upon any desired line. In case of wear, the removable lining may be replaced, or by varying the thickness of the lining, the chuck may be made applicable for nuts of different sizes.

Fig. 10 illustrates a chuck that is somewhat different in that it is more like a piece of pipe, or that is, is tubular. Referring to the figure, 41 and 42 represent the chuck parts secured together by a collar 43, or the equivalent. In this case I have shown the chuck supported by the frame 44 secured in position by a collar 46 and the sprocket wheel 45, which may be used to drive the chuck. I also illustrate a guard 47 arranged over the top and sides of the end 42, the same being open at the bottom half, so that the nuts may be dropped out.

In Fig. 11 a slightly modified tap is shown, in which 48 represents the cutting tool, 49 the straight shank, and 50 a curved shank end, the tap, when assembled, being substantially similar to that shown in Fig. 4. A tap of this form should be very easily inserted in a tap chuck, even though the chuck was made in one piece. As an illustration, refer to Fig. 10. If the pipe parts 41 and 42 were integral, the tap might be very readily inserted by unscrewing the two parts, then inserting the curved part 50 into the curved part of the chuck, and the straight shank part 49 into the straight part of the chuck, and then screwing the two parts together. The threads, however, should be so arranged that there would be no tendency for the tapping parts to unscrew during the operation of the machine.

Having thus described my invention, it is obvious that various immaterial modifications may be made in the same without departing from the spirit of my invention, hence I do not wish to be understood as limiting myself to the exact form, construction, arrangement or combination of parts herein shown and described, or uses mentioned.

What I claim as new and desire to secure by Letters Patent is:—

1. In a nut tapping machine, the combination of a rotatable chuck holder provided with a recess at one end, of a chuck adapted to detachably fit within the recess in the holder and provided with a passage extending through the same and bent at an angle from a straight line, and a coöperating tap bent in substantial uniformity to the passage of the chuck and adapted to be positioned therein, said chuck consisting of sections separable to permit the positioning of the said tap in the passage of the chuck, the sections of the chuck being held together and supported by the holder, and means coupling the chuck and chuck holder for rotation together.

2. In a nut tapping machine, the combination of a rotatable chuck holder provided with a recess at one end, of a chuck adapted to removably fit within the recess in the holder and provided with a passage extending through the same, the passage being bent at an angle from a straight line, and a tap bent in substantial uniformity to the passage and adapted to be positioned in the passage of the chuck, said chuck being divided longitudinally into separable sections to permit the positioning of the said tap in the passage of the chuck, the separable sections of the chuck being held together and supported by the holder, and a part of the chuck engaging a part on the chuck holder to couple the chuck and holder for rotation together.

3. In a nut tapping machine, the combination of a rotatable chuck holder provided with a recess at one end thereof, of a chuck adapted to be removably fitted within the recess of the holder and provided with a passage extending through the same and bent at an angle from a straight line, and a coöperating tap bent in substantial uniformity to the passage of the chuck and adapted to be positioned in the said passage, said chuck comprising a block divided longitudinally into two mating parts to permit the positioning of the tap in the passage of the chuck, the walls of the recess of the chuck holder being disposed at an angle to each other, and the chuck having angularly disposed outer faces engaging the angularly disposed walls of the said recess, the separable sections of the chuck being held together and supported by the holder.

4. A nut tapping machine including a suitable frame provided with a stationary head, said head being recessed to provide a cylindrical bearing extending inwardly from one end thereof, a chuck holder supported for rotation in the cylindrical bearing of the stationary head, a shaft extending through an opening in the other end of said stationary head and connected with the chuck holder, and a tap loosely positioned in the chuck and centered therein by nuts mounted on the tap.

In testimony whereof, I have hereunto signed my name in the presence of two subscribing witnesses.

GEORGE H. RIDLON.

Witnesses:
W. E. SHAY,
L. J. FLINT.